US009057624B2

(12) United States Patent
Malahy et al.

(10) Patent No.: US 9,057,624 B2
(45) Date of Patent: Jun. 16, 2015

(54) SYSTEM AND METHOD FOR VEHICLE NAVIGATION WITH MULTIPLE ABSTRACTION LAYERS

(71) Applicant: CloudCar, Inc., Los Altos, CA (US)

(72) Inventors: Evan Malahy, Santa Clara, CA (US); Ron Morris, Seattle, WA (US)

(73) Assignee: CloudCar, Inc., Mountain View, CA (US)

( * ) Notice: Subject to any disclaimer, the term of this patent is extended or adjusted under 35 U.S.C. 154(b) by 57 days.

(21) Appl. No.: 13/730,912

(22) Filed: Dec. 29, 2012

(65) Prior Publication Data

US 2014/0188388 A1 Jul. 3, 2014

(51) Int. Cl.
G01C 21/36 (2006.01)
G01C 21/34 (2006.01)

(52) U.S. Cl.
CPC .......... *G01C 21/367* (2013.01); *G01C 21/3647* (2013.01); *G01C 21/3446* (2013.01)

(58) Field of Classification Search
CPC .......... G01C 21/3626; G01C 21/3647; G01C 21/20; G01C 21/3484; G01C 21/3664; G01C 21/36; G01C 21/3617; G01C 21/3446; G01C 21/34; G01C 21/3461; G09B 29/106; G06T 19/20; B60R 16/0236; B60W 10/06; B60K 35/00; H04M 1/6091; G08G 1/0969
USPC ................ 701/31.4, 410, 423, 414, 438, 533; 715/771
See application file for complete search history.

(56) References Cited

U.S. PATENT DOCUMENTS

| 8,046,501 B2 | 10/2011 | Gormley | |
| 2004/0012505 A1* | 1/2004 | Yokota | 340/995.1 |
| 2008/0201070 A1* | 8/2008 | Kikuchi | 701/209 |
| 2008/0276167 A1* | 11/2008 | Michael | 715/273 |
| 2008/0288166 A1* | 11/2008 | Onishi et al. | 701/209 |
| 2010/0114485 A1* | 5/2010 | Bhogal et al. | 701/210 |
| 2011/0153141 A1* | 6/2011 | Beechie et al. | 701/29 |
| 2011/0202862 A1* | 8/2011 | Kramer et al. | 715/771 |
| 2012/0323481 A1* | 12/2012 | Bhattiprolu et al. | 701/410 |
| 2013/0035853 A1* | 2/2013 | Stout et al. | 701/438 |
| 2013/0131986 A1* | 5/2013 | Van Seggelen et al. | 701/533 |
| 2013/0173159 A1* | 7/2013 | Trum et al. | 701/533 |
| 2013/0197796 A1* | 8/2013 | Obradovich et al. | 701/423 |

OTHER PUBLICATIONS

Georg zur Bonsen, Daniel Ammann, Michael Ammann, Etienne Favey, and Pascal Flammant, "Combining GPS with Sensor-Based Dead Reckoning", GPS World, Apr. 1, 2005.

* cited by examiner

*Primary Examiner* — Tuan C. To
*Assistant Examiner* — Yuri Kan
(74) *Attorney, Agent, or Firm* — Inventive Patent Law P.C.; Jim H. Salter

(57) ABSTRACT

Systems and methods for vehicle navigation with multiple abstraction layers are disclosed. A particular embodiment includes: receiving data sets from a plurality of sources; generating, by use of a data processor, a routing overlay based on a routing to a selected destination; generating, by use of the data processor and data from the data sets, a plurality of navigation abstraction layers corresponding to the routing; generating at least one navigation abstraction layer by smoothing or simplifying the shape of the routing overlay; and presenting at least one of the plurality of navigation abstraction layers to a user via a display interface.

20 Claims, 13 Drawing Sheets

SYSTEM AND METHOD FOR VEHICLE NAVIGATION WITH MULTIPLE ABSTRACTION LAYERS

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2010-2012, CloudCar Inc., All Rights Reserved.

TECHNICAL FIELD

This patent document pertains generally to tools (systems, apparatuses, methodologies, computer program products, etc.) for vehicle navigation.

BACKGROUND

An increasing number of vehicles are being equipped with one or more independent computer and electronic processing systems. Certain of the processing systems are provided for vehicle operation or efficiency. For example, many vehicles are now equipped with computer systems for controlling engine parameters, brake systems, tire pressure and other vehicle operating characteristics. A diagnostic system may also be provided that collects and stores information regarding the performance of the vehicle's engine, transmission, fuel system and other components. The diagnostic system can typically be connected to an external computer to download or monitor the diagnostic information to aid a mechanic during servicing of the vehicle.

Additionally, other processing systems may be provided for vehicle driver or passenger comfort and/or convenience. For example, vehicles commonly include navigation and global positioning systems and services, which provide travel directions and emergency roadside assistance. Vehicles are also provided with multimedia entertainment systems that include sound systems, e.g., satellite radio, broadcast radio, compact disk and MP3 players and video players. Still further, vehicles may include cabin climate control, electronic seat and mirror repositioning and other operator comfort features.

The variety of subsystems in a vehicle can be distracting to drivers who must keep their eyes on the road. Drivers have only short moments to glance at information presented by these subsystems. For example, a driver doesn't have the time while driving to study a detailed map presented by a vehicle navigation system. As a result, the driver can miss important route guidance information. Some conventional navigation systems provide audible navigation guidance. However, audible navigation guidance does not provide the benefits of spatial orientation and the advance routing clues inherent in a two-dimensional map display.

BRIEF DESCRIPTION OF THE DRAWINGS

The various embodiments is illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

As described in various example embodiments, a system and method for vehicle navigation with multiple abstraction layers are described herein. An example embodiment provides a vehicle navigation system presenting navigation information to a driver in various levels of abstraction thereby enabling the driver to quickly ascertain the most important navigation information with just a glance. The multiple abstraction layers are generated in a manner that is situationally-aware and predictively-aware in the context of the driver's destination, routing, current location, vehicle status, traffic and weather conditions, configuration parameters, past driver behavior and learned affinity, proximity to points of interest, proximity to people in a contact list, and a variety of other information that shapes a specific context for a particular driver at a particular time and location. The vehicle navigation system described herein customizes the navigation information presented to a driver so the most pertinent information is prominently displayed at the appropriate time. Additionally, the vehicle navigation system automatically adjusts the information and routing instructions displayed based on a cost of cost of error determination. Finally, the vehicle navigation system can generate a routing to a "close enough" or near destination if a routing to a desired destination is unavailable. An example embodiment of the vehicle navigation system for presenting multiple abstraction layers is described in more detail below.

In one particular embodiment, a vehicle navigation system for presenting multiple abstraction layers is provided in the context of a cloud-based vehicle information and control ecosystem configured and used as a computing environment with access to a wide area network, such as the Internet. However, it will be apparent to those of ordinary skill in the art that the vehicle navigation system for presenting multiple abstraction layers described and claimed herein can be implemented, configured, and used in a variety of other applications and systems.

Figure 1:
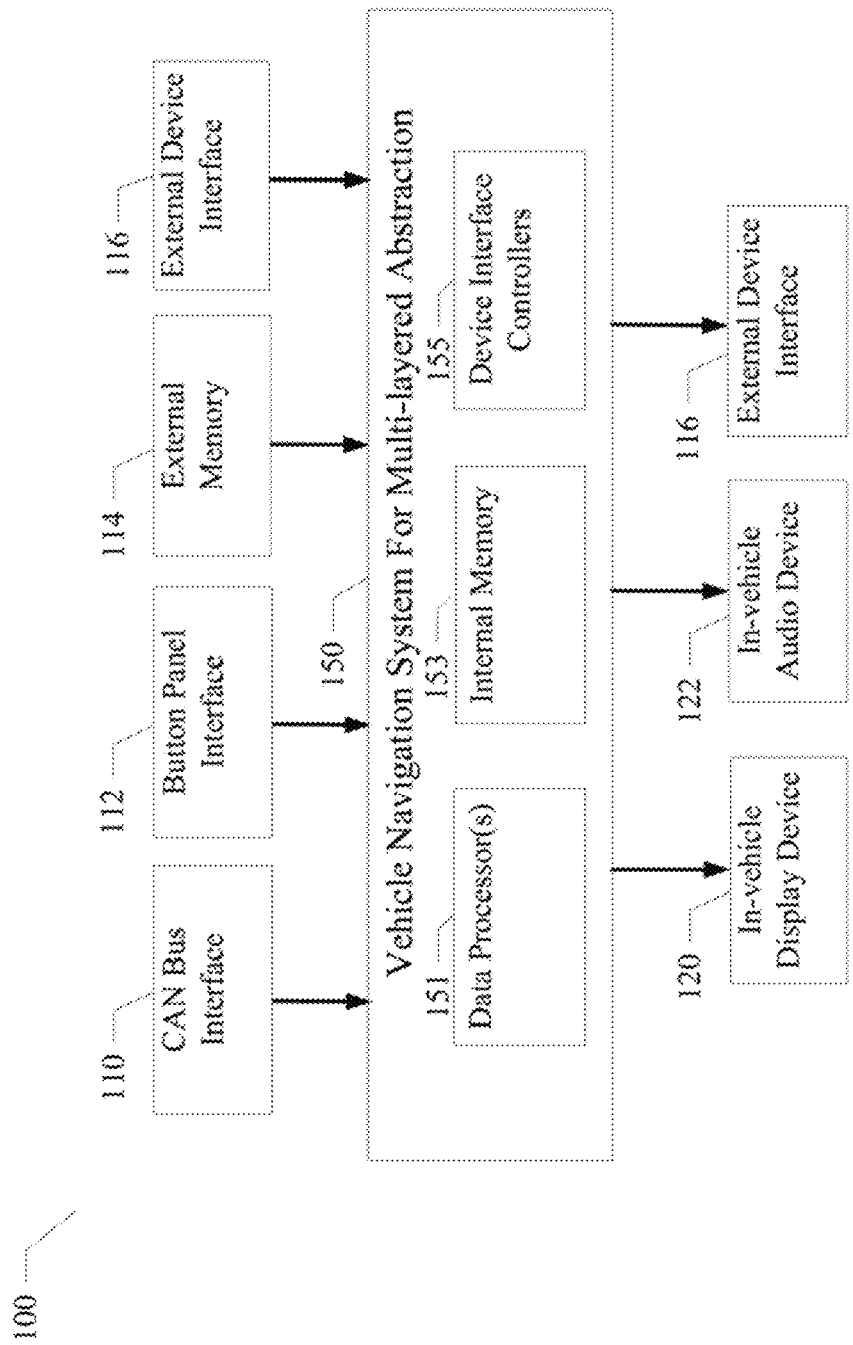
FIG. 1 illustrates an example embodiment of the hardware components of the vehicle navigation system for presenting multiple abstraction layers.

Referring now to FIG. 1, a diagram illustrates an example embodiment of the hardware components of the vehicle navigation system for presenting multiple abstraction layers. As shown, a vehicle navigation system 150 can include one or more data processor(s) 151, internal memory 153, and a set of device interface controllers 155 for transferring data to and from the vehicle navigation system 150 and various connected devices, such as the devices shown in FIG. 1. In a particular embodiment, the vehicle navigation system 150 can be installed in a vehicle and coupled to a Controller Area Network (CAN) bus in the vehicle via the CAN bus interface 10. The use of a CAN bus in a vehicle is well-known to those of ordinary skill in the art.

Particular example embodiments relate to the communication of signals and information and the activation of procedures and/or services between the vehicle navigation system 150, other devices coupled to CAN bus in a vehicle, and external devices, such as mobile devices (e.g., iPhone™), which can be accessed via a WiFi (a popular technology allowing an electronic device to exchange data wirelessly over a computer network) wireless data connection or the CAN bus and the cloud-based vehicle information and control ecosystem described in the above-referenced patent application. The external device interface 116 is provided to enable data communication between these external devices and the vehicle navigation system 150. Embodiments disclosed herein can use the signals communicated between electronic control units (ECUs) of a vehicle, a controller platform, and the CAN bus. Data signals communicated from the ECUs to the vehicle navigation system 150 may include information about the state of one or more of the components of the vehicle. The states of these vehicle components or the data produced by these components may be used by the vehicle navigation system 150 for the generation of navigation data. For example, the speed reported by the speedometer, the distance reported by the odometer, or the geographical location (geo-location) reported by a Global Positioning System (GPS) receiver in the vehicle may be obtained via the CAN bus and used by the vehicle navigation system 150 for the generation of navigation data.

As used herein, the term "CAN bus," refers to any bus or bus system used in a vehicle for communicating signals, data, and/or messages between ECUs or components. The CAN bus may be a bus that operates according to versions of the CAN specification, but is not limited thereto. The term "CAN bus" can therefore refer to buses that operate according to other specifications, including those that might be developed in the future.

As used herein and unless specified otherwise, the term "mobile device" extends to any external device that can communicate with the vehicle navigation system 150 described herein to obtain read or write access to signals, data, and/or messages generated by the vehicle navigation system 150, or signals, data, and/or messages communicated on a CAN bus or via any other mode of inter-process data communications. In many cases, the mobile device is a handheld, portable device, such as a smart phone, mobile phone, cellular telephone, tablet computer, laptop computer, display pager, radio frequency (RF) device, infrared (IR) device, global positioning device (GPS), Personal Digital Assistants (PDA), handheld computers, wearable computer, portable game console, other mobile communication and/or computing device, or an integrated device combining one or more of the preceding devices, and the like. Additionally, the mobile device can be a computing device, personal computer (PC), multiprocessor system, microprocessor-based or programmable consumer electronic device, network PC, diagnostics equipment, a system operated by a vehicle manufacturer or service technician, and the like, and is not limited to portable devices. The mobile device can receive and process data in any of a variety of data formats. The data format may include or be configured to operate with any programming format, protocol, operating system, or language including, but not limited to, JavaScript, C++, iOS, Android, etc.

Referring still to FIG. 1, a button panel interface 112 provides a mechanism for receiving signals corresponding to the activation of buttons, dials, sliders, or other input devices provided on a front panel of an in-vehicle navigation unit. These signals from the button panel interface 112 can be used by the vehicle navigation system 150 to generate configuration data for customizing the operation of the vehicle navigation system 150. External memory 114 can be provided for an expanded workspace as the vehicle navigation system 150 builds multiple layers of abstracted navigation data. The external memory 114 can also be used by the vehicle navigation system 150 for pre-generating several navigation scenarios that may be presented to the user/driver, depending on the progress of the vehicle. For example, the vehicle navigation system 150 can build multiple layers of abstracted navigation data to guide the driver to a desired destination. This data can be stored in a portion of the external memory 114. In a speculative alternative scenario generation process, the vehicle navigation system 150 can also build abstracted navigation data to guide the driver to a desired destination if a next turn is missed. Additionally, the vehicle navigation system 150 can also use a speculative alternative scenario generation process build abstracted navigation data to guide the driver to an approaching point of interest, in anticipation of the driver choosing to deviate from a current routing to the point of interest.

Referring still to FIG. 1, the vehicle navigation system 150 can be coupled to an in-vehicle display device 120, an in-vehicle audio device 122, and the external device interface 116 described above. The in-vehicle display device 120 can include standard liquid crystal displays (LCD), plasma displays, or other conventional display technologies suitable for operation in a vehicle. The in-vehicle display device 120 can also include a heads-up display (HUD) or an auxiliary or secondary display system. The in-vehicle audio device 122 can include standard audio subsystems for generating synthetic audible speech for conveying navigation instructions to a driver in an audible form. Additionally, the in-vehicle audio device 122 can include a microphone or other audio input device for receiving spoken commands from a driver or occupant of the vehicle. Such in-vehicle audio devices 122 are well-known to those of ordinary skill in the art. As described above, the external device interface 116 is provided to enable data communication between external devices, such as a mobile phone, and the vehicle navigation system 150. The data generated by the vehicle navigation system 150 can also be communicated to a mobile device via the external device interface 116 for presentation on a display of the mobile device. The external device interface 116 can communicate the navigation data to the mobile device by use the CAN bus and the cloud-based vehicle information and control ecosystem described in the above-referenced patent application.

Figure 2:
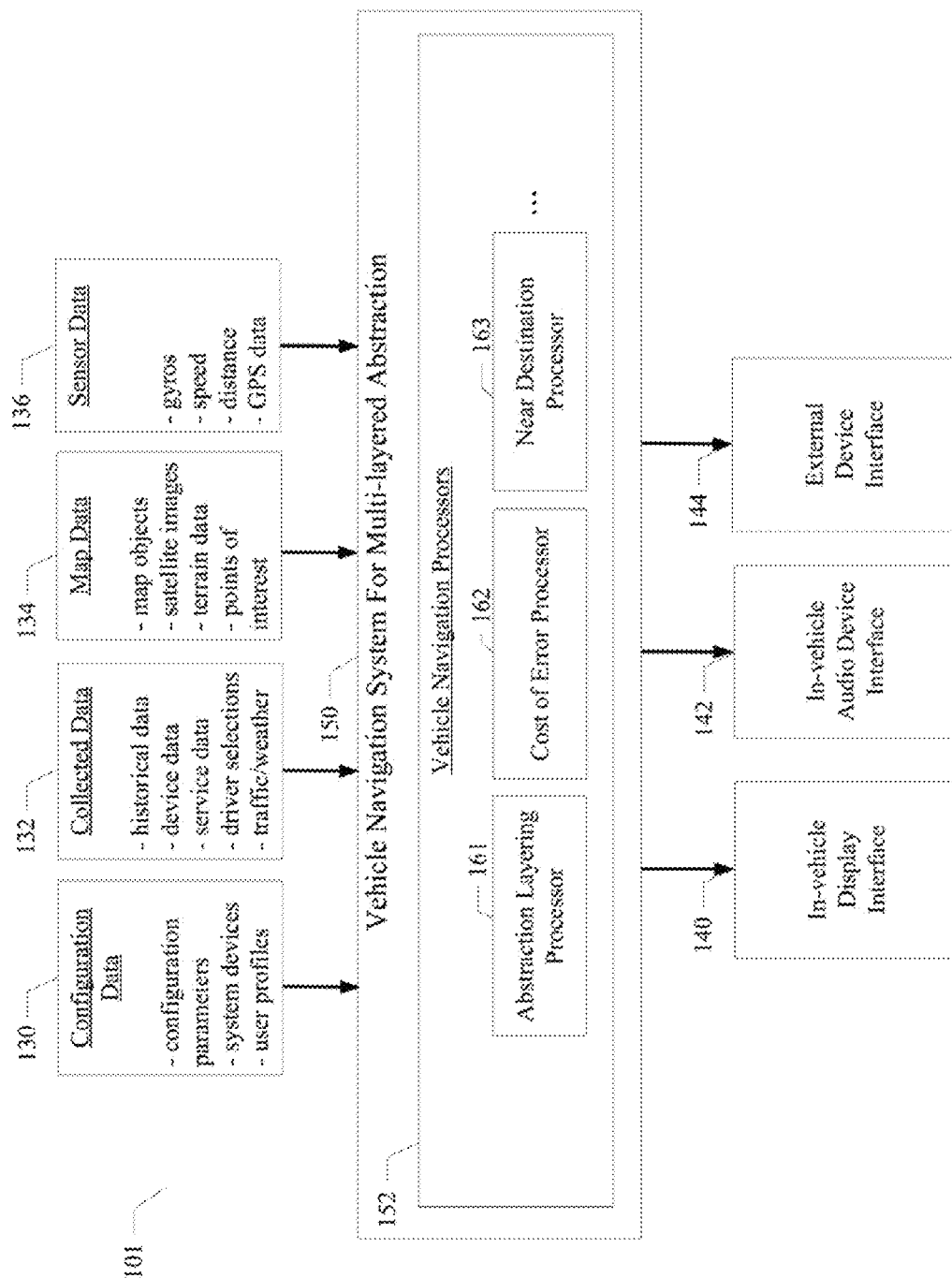
FIG. 2 illustrates an example embodiment of the data components of the vehicle navigation system for presenting multiple abstraction layers.

Referring now to FIG. 2, a diagram illustrates an example embodiment of the data components of the vehicle navigation system for presenting multiple abstraction layers. As shown, the vehicle navigation system 150 can use a variety of data sets including: configuration data 130, collected data 132, map data 134, and sensor data 136. It will be apparent to those of ordinary skill in the art that other similar data can be used by an equivalent alternative embodiment. Configuration data 130 can include a variety of configuration parameters, a registry of installed or connected devices, a set of default system data, user/driver data including previously provided user profile data for one or more users, operational parameters or defaults, and the like. Collected data 132 can include sets of data gathered over time during operation of the vehicle navigation system 150. For example, collected data 132 can include historical data, such as previous destinations, previous routings, distance and timing data from prior routes, and the like. The historical data can be used by the vehicle navigation system 150 to infer the habits, preferences, or affinity of a particular user/driver. The collected data 132 can also include previous user/driver selections, such as mode selections, destinations, routing selections, preferred information display selections, and the like. The previous user/driver selection data can also be used by the vehicle navigation system 150 to infer the habits, preferences, or affinity of the particular user/driver. Map data 134 provides the source of map data for the vehicle navigation system 150. The map data 134 can be provided on a physical medium, such as an optical disc, a magnetic disc, a flash drive, or the like. The map data 134 can also be provided on a virtual medium, such as a data connection with an external device via the external device interface 144. The map data 134 can be downloaded to the vehicle navigation system 150 via a WiFi wireless data connection or via the CAN bus. The content of the map data 134 is well-known to those of ordinary skill in the art. Typically, the map data includes data objects representing terrain, roadways, bodies of water, buildings, landmarks, points of interest, and the like that are typically shown on standard maps for vehicle navigation. The map data also includes geo-location information associated with the data objects so each data object can be accurately plotted on a two-dimensional map. Further, a variety of zoom levels are provided so the data objects can be plotted on a map at a specified scale. In some cases, satellite images can be shown as an overlay on a map. Such map data and satellite imagery is available, for example, from Google™ Maps. Finally, sensor data 136 can include data obtained from various subsystems in the vehicle. These subsystems can include, for example, gyros, speedometer, odometer, GPS receiver, and the like. The data from these vehicle subsystems can be obtained from corresponding ECUs via the CAN bus.

FIGS. 3 through 11 illustrate various information display snapshots showing various sample abstraction layers produced by the vehicle navigation system 150 of an example embodiment. The vehicle navigation system 150 of an example embodiment can use the data sets described above and the vehicle navigation processors 152, shown in FIG. 2, to generate a plurality of navigation abstraction layers that can be presented to a user/driver via the in-vehicle display interface 140, via the in-vehicle audio device interface 142, and/or to a mobile device via the external device interface 144. The operation of the vehicle navigation processors 152 are described in more detail below using the example abstraction layer images shown in FIGS. 3 through 11.

The various levels of abstraction enable the driver to quickly ascertain the most important navigation information with just a glance. This is important because a driver has very little time to view an information display while driving. The multiple abstraction layers are generated by the abstraction layering processor 161, shown in FIG. 2, in a manner that is situationally-aware and predictively-aware in the context of the driver's destination, routing, current location, vehicle status, traffic and weather conditions, configuration parameters, past driver behavior and learned affinity, proximity to points of interest, proximity to people in a contact list, and a variety of other information that shapes a specific context for a particular driver at a particular time and location. The vehicle navigation system 150 described herein customizes the navigation information presented to a driver so the most pertinent information is prominently displayed at the appropriate time. Additionally, the vehicle navigation system automatically adjusts the information and routing instructions displayed based on a cost of error determination produced by the cost of error processor 162, shown in FIG. 2. Finally, the vehicle navigation system can use the near destination processor 163, shown in FIG. 2, to generate a routing to a "close enough" or near destination if a routing to a desired destination is unavailable.

Figure 3:
FIGS. 3 through 11 illustrate various information display snapshots showing various sample abstraction layers produced by the vehicle navigation system of an example embodiment.
Figure 4:
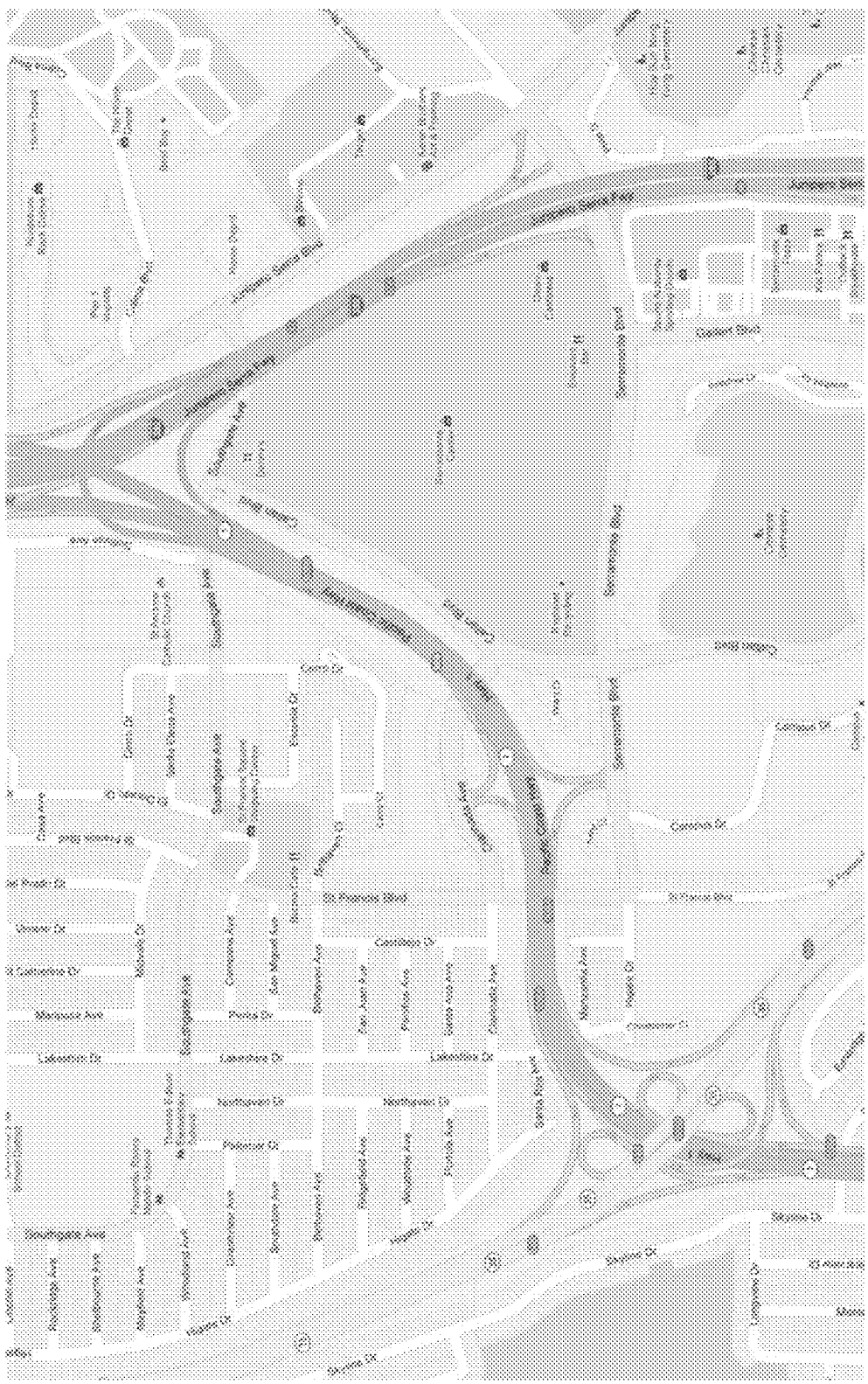

Referring now to FIG. 3, a sample satellite image of a location is shown. Using well-known techniques, such satellite images can be obtained from a variety of sources for a variety of locations and displayed on an in-vehicle display device 120 or an external display device using external device interface 116. Similarly, FIG. 4 illustrates a sample map image of the same location. Again, using well-known techniques, such map images can be obtained from a variety of sources. These map images include many map objects or map features, such as representations of roadways, highway/street names, points of interest, and the like. Using well-known techniques, such map images can be presented in a variety of zoom levels or levels of scale. However, note that a significant amount of detail is presented. Such detail prevents a driver from assimilating the information needed while the driver is driving.

Figure 5:
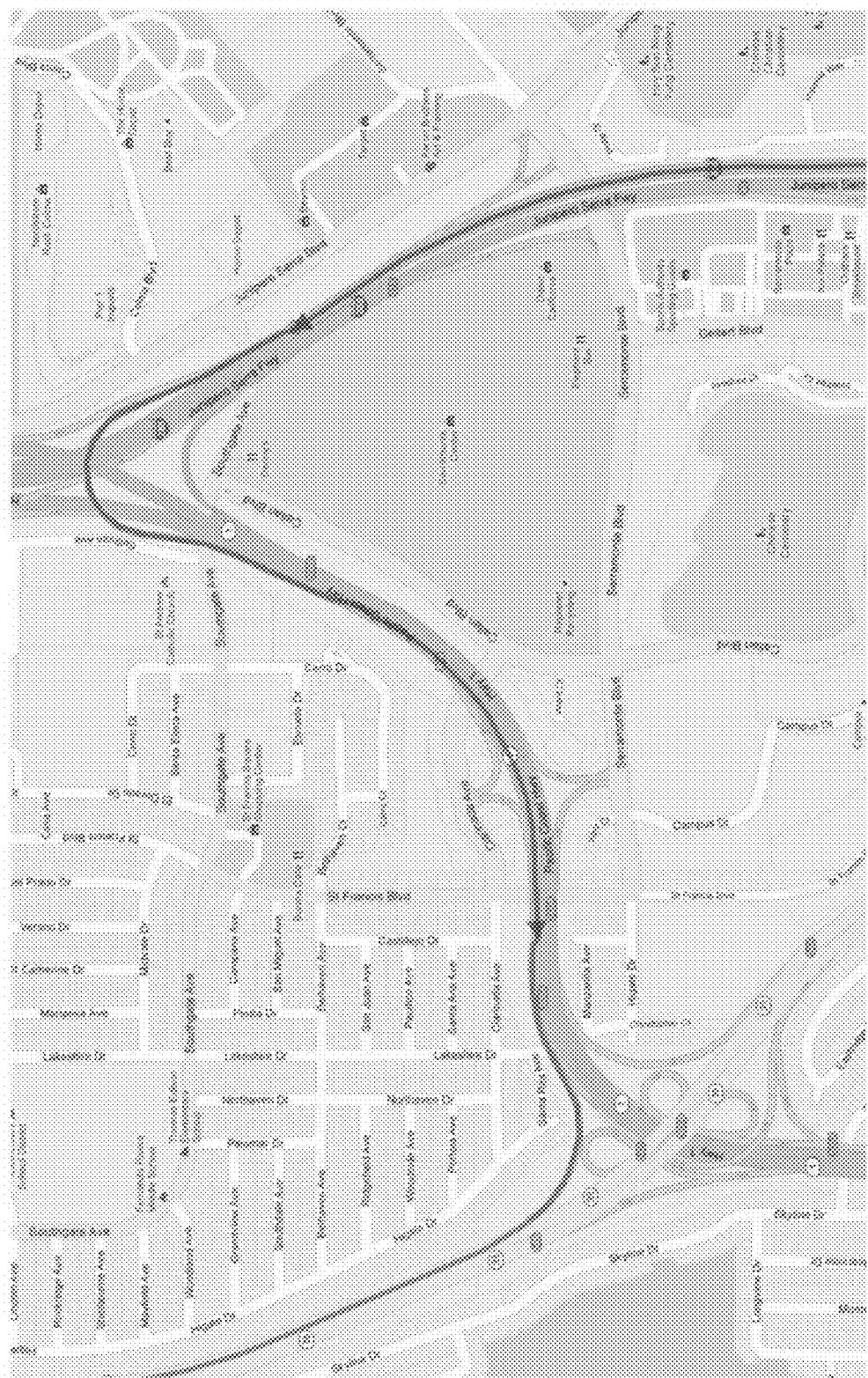

Referring now to FIG. 5, using well-known techniques, a driver has selected a destination and a route to the destination has been generated. The destination routing is presented to the driver as a blue line overlaying the map image. Again, however, the driver would need to study the map image with the routing overlay to understand the important details and implications of the generated routing. This is not possible while the driver is driving.

Figure 6:
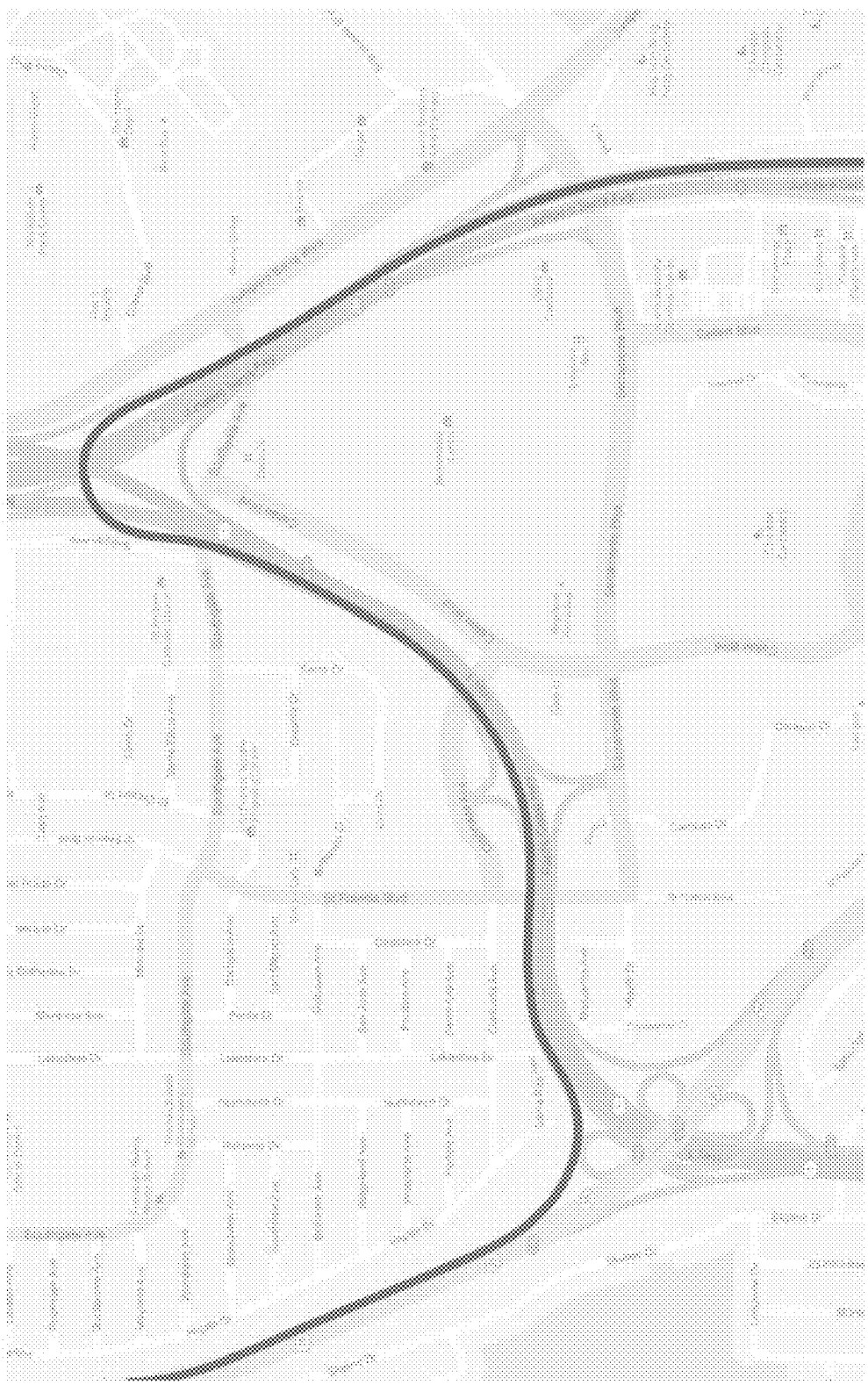

Referring now to FIG. 6, the abstraction layering processor 161 has taken the map image with the routing overlay and created a first abstraction layer. This first abstraction layer can be created by isolating the details of the map image from the routing overlay. As a result, the routing overlay, having a distinctive shape corresponding to the routing path, can be displayed as an image isolated from the details of the map image. As shown in FIG. 6, the map features can be displayed as 'ghost' images or images displayed with reduced contrast.

Figure 7:
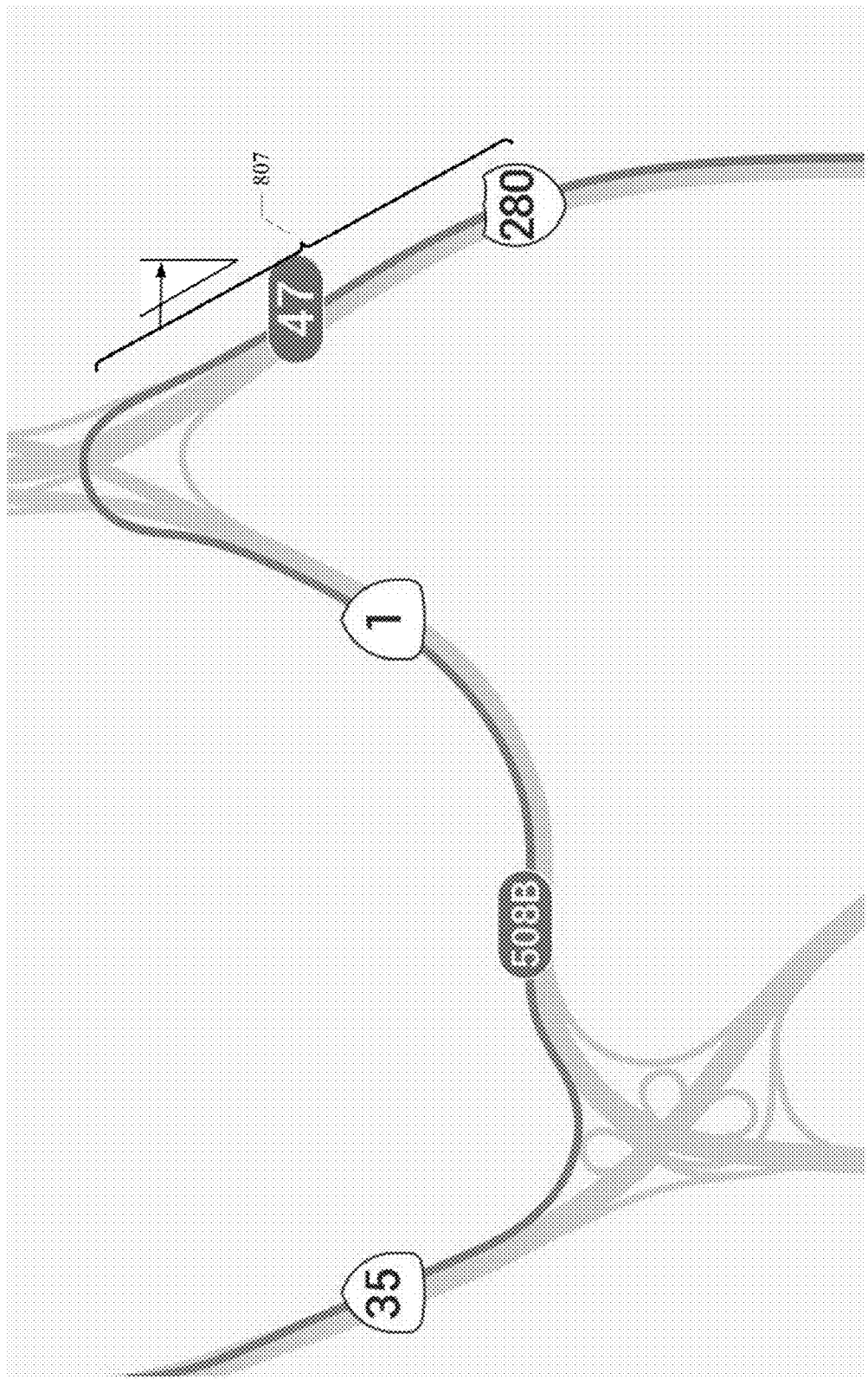

Referring now to FIG. 7, the abstraction layering processor 161 has taken the first abstraction layer with the isolated routing overlay and created a second abstraction layer. This second abstraction layer can be created by removing all but the most important map features. The important map features can be features that are included as part of the destination routing (e.g., roadways used by the routing, landmarks or points of interest used in the routing, signage or identifiers used in the routing, etc.). As shown in the example of FIG. 7, most distracting map features have been removed, except for the roadways and signage for the routing. As can be seen, the second abstraction layer has already produced a navigation display that is less distracting for the driver. In one embodiment, the driver can select the second abstraction layer as a desired navigation view for a particular routing or for all navigation routings. In an alternative embodiment, the second abstraction layer can be automatically selected for the driver by the vehicle navigation system 150 as a desired navigation view for a portion of a routing, the entirety of a particular routing, or for all navigation routings. Because the vehicle navigation system 150 is aware of the specific context for a particular driver at a particular time and location, the vehicle navigation system 150 can dynamically and automatically select the second abstraction layer as the current navigation view for the particular context. Additionally, depending on the specific context for the particular driver at a particular time and location, the vehicle navigation system 150 can automatically shift (or replicate) the presentation of the second abstraction layer to an alternate display device, such as a heads-up display (HUD) or a secondary display device in the vehicle.

Figure 8:
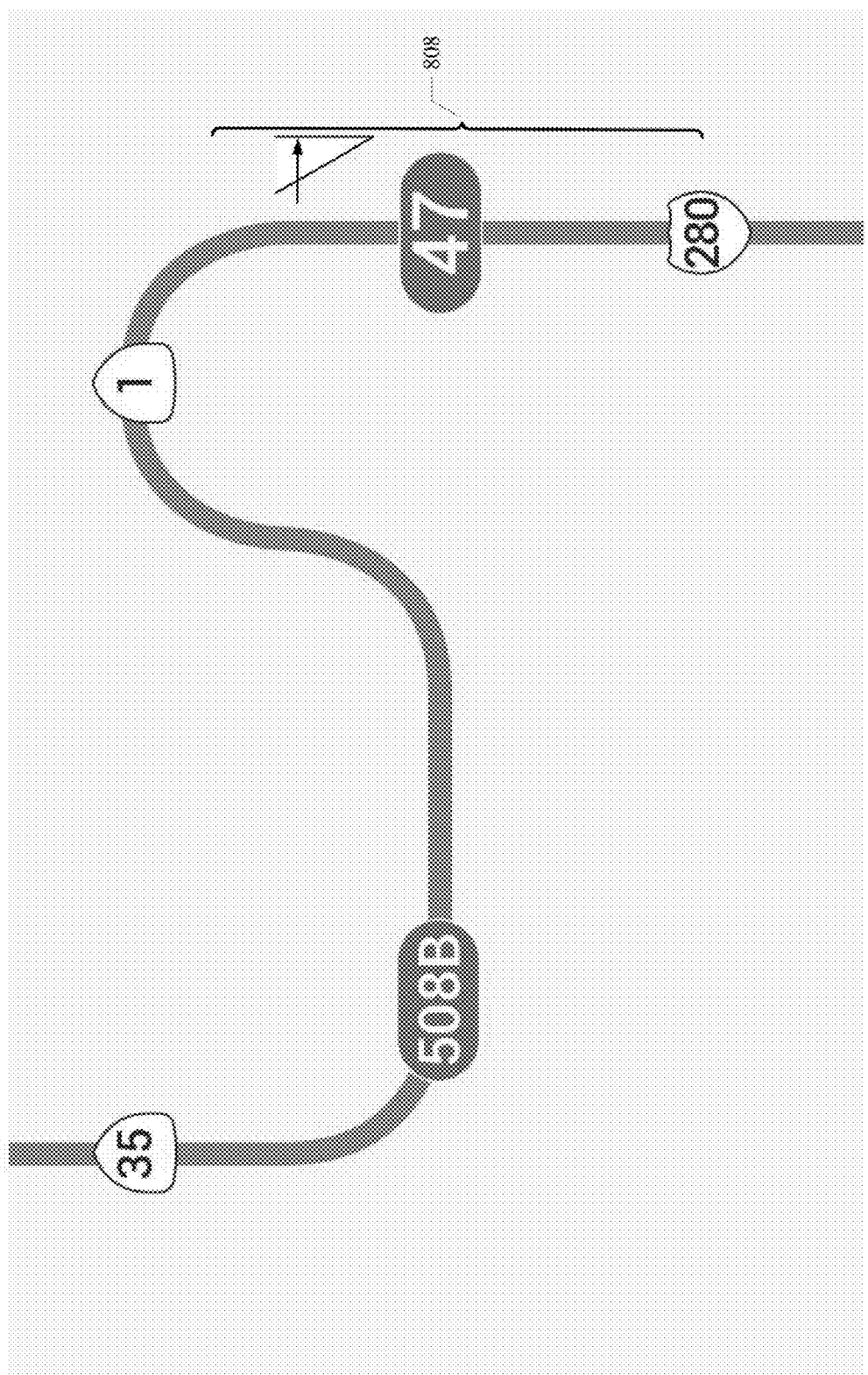

Referring now to FIG. 8, the abstraction layering processor 161 has taken the second abstraction layer with the removed map features and created a third abstraction layer. This third abstraction layer can be created by smoothing or simplifying the shape of the routing overlay. This smoothing or simplifying of the routing overlay can be performed using a variety of techniques. For example, the original routing overlay is produced by plotting points along the generated routing path and drawing segments of the overlay between these points. Smoothing or simplifying can be performed by removing the number of plotted points and the number of line segments that comprise the overlay. Another smoothing or simplifying technique can orthogonally adjust segments of the routing overlay to produce an overlay having segments that are generally horizontal or vertical. For example, if a segment of a routing path follows a direction that is not horizontal or vertical, the abstraction layering processor 161 can shift these segments of the routing overlay to follow a generally horizontal or vertical direction. For example, an overlay segment 807 shown in FIG. 7 follows a generally diagonal direction. The abstraction layering processor 161 can shift this segment to follow a generally vertical direction as illustrated by the corresponding overlay segment 808 shown in FIG. 8. Similarly, other portions of the routing overlay can be orthogonally adjusted to follow a generally horizontal or vertical direction as shown in FIG. 8. As also shown in FIG. 8, the signage, roadway identifiers, important landmarks, etc. can also be shown in corresponding locations on or adjacent to the routing overlay to aid the driver in quickly identifying the important signs or landmarks on the route. One benefit of this abstraction layer is to simplify the view of the routing overlay and the important route identifiers for the driver. As can be seen in the sample view of FIG. 8, the third abstraction layer provides a navigation display that is less distracting for the driver. In one embodiment, the driver can select the third abstraction layer as a desired navigation view for a particular routing or for all navigation routings. In an alternative embodiment as described above, the third abstraction layer can be automatically selected for the driver by the vehicle navigation system 150 as a desired navigation view for a portion of a routing, the entirety of a particular routing, or for all navigation routings. Because the vehicle navigation system 150 is aware of the specific context for a particular driver at a particular time and location, the vehicle navigation system 150 can dynamically and automatically select the third abstraction layer as the current navigation view for the particular context. Additionally, depending on the specific context for the particular driver at a particular time and location, the vehicle navigation system 150 can automatically shift (or replicate) the presentation of the third abstraction layer to an alternate display device, such as a heads-up display (HUD) or a secondary display device in the vehicle.

Figure 9:
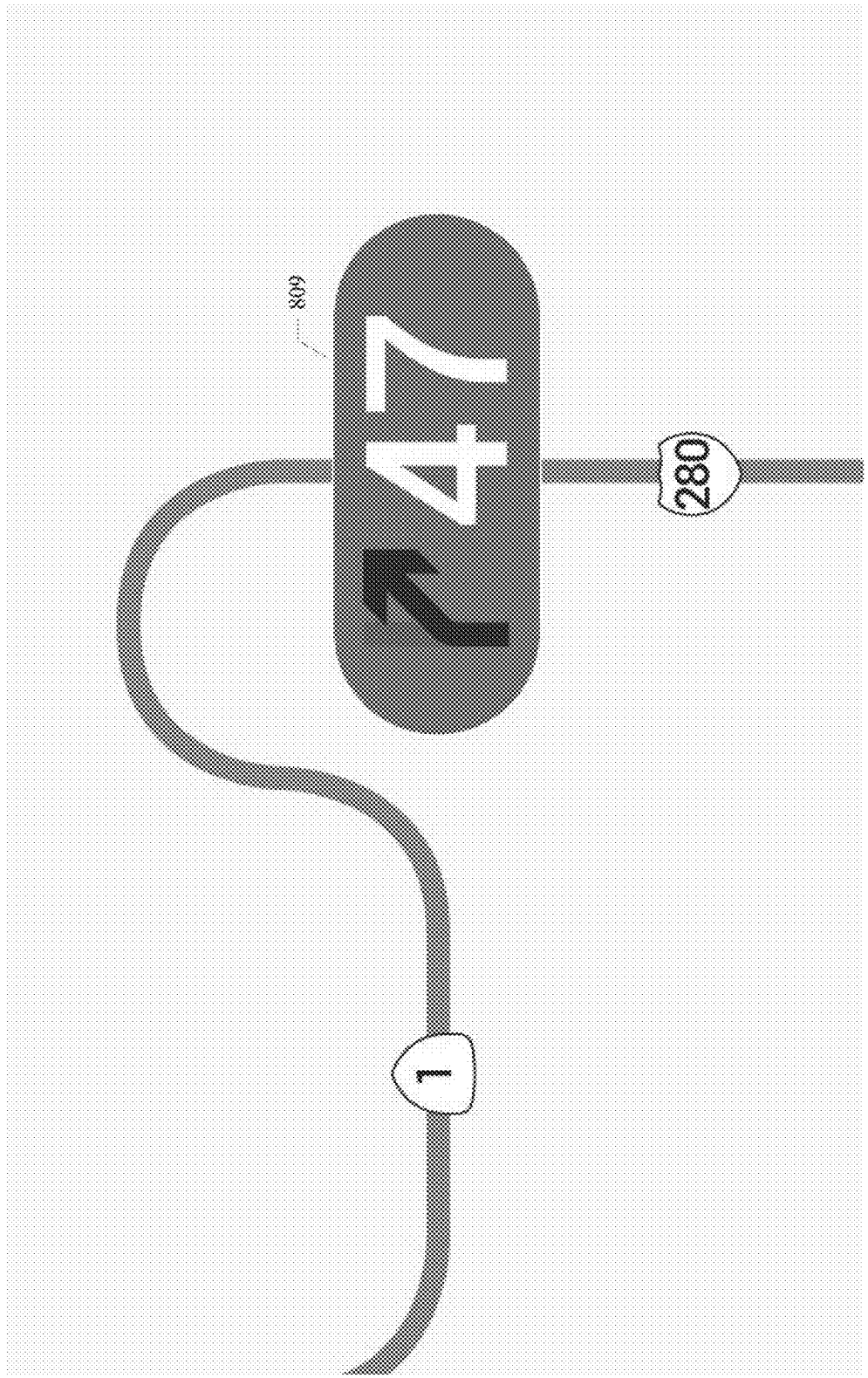

Referring now to FIG. 9, the abstraction layering processor 161 has taken the third abstraction layer with the smoothed shape of the routing overlay and created a fourth abstraction layer. This fourth abstraction layer can be created by highlighting one or more next actions the driver must perform to follow the generated routing. These highlighted next actions can be displayed on or adjacent to the smoothed routing overlay produced in the third abstraction layer. For example, the sample view of FIG. 9 shows a highlighted action 809 displayed on the smoothed routing overlay. In this case, the highlighted action 809 instructs the driver to follow signs to Highway 47 to the right. A variety of well-known icons or markings can be used to indicate an action in a symbolic form. As shown by the sample view of FIG. 9, the driver can quickly ascertain the routing instructions with a brief glance at the displayed information.

Additionally, a particular embodiment can use the collected data 132 and the configuration data 130 to customize or personalize the highlighted next actions displayed on or adjacent to the smoothed routing overlay. For example, using historical data from collected data 132, the abstraction layering processor 161 can determine if the driver has traveled the same route previously and whether the driver frequently travels the same route. In cases where the driver frequently travels the same route, the abstraction layering processor 161 can customize the display of highlighted next actions by presenting a fewer quantity of reminders. In conventional navigation systems, the driver is constantly reminded of up-coming actions (e.g., right turn in half a mile, right turn in 700 feet, right turn in 500 feet, etc.) with no regard for how familiar the driver might be with the route. In contrast, the abstraction layering processor 161 of an example embodiment can present a fewer quantity of reminders for drivers familiar with a routing. As such, the abstraction layering processor 161 of an example embodiment is situationally aware of the context in which the vehicle navigation system 150 is operating and can adjust accordingly. Additionally, because the vehicle navigation system 150 can dynamically adjust generated output based on a particular context, the vehicle navigation system 150 can provide personalized navigation. Further examples of the situational awareness and personalized navigation provided by the vehicle navigation system 150 are provided below.

Figure 10:
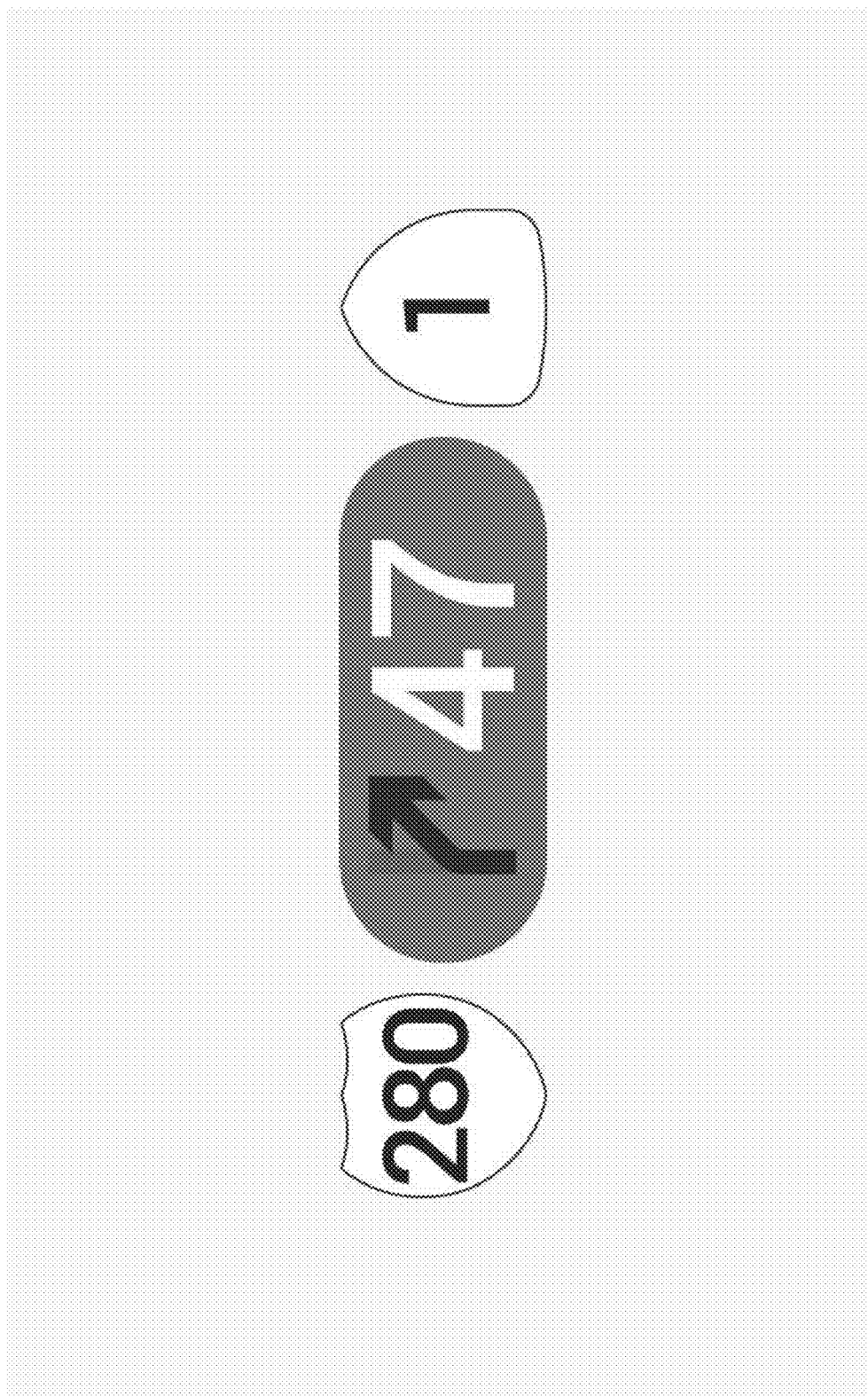

Referring now to FIG. 10, the abstraction layering processor 161 has taken the fourth abstraction layer with the highlighted next actions and created a fifth abstraction layer. This fifth abstraction layer can be created by removing the routing path overlay and merely displaying the highlighted one or more next actions the driver must perform to follow the generated routing. These highlighted next actions can be displayed in an iconic or symbolic form as described above. Moreover, the highlighted next actions can be displayed in a top-down ordering to indicate a sequence of actions in a particular order. As also shown in FIG. 10, the signage, roadway identifiers, important landmarks, etc. can also be shown in corresponding locations on or adjacent to the highlighted next actions to aid the driver in quickly identifying the important signs or landmarks on the route. As shown by the sample view of FIG. 10, the driver can quickly ascertain the routing instructions with a brief glance at the displayed information.

Figure 11:
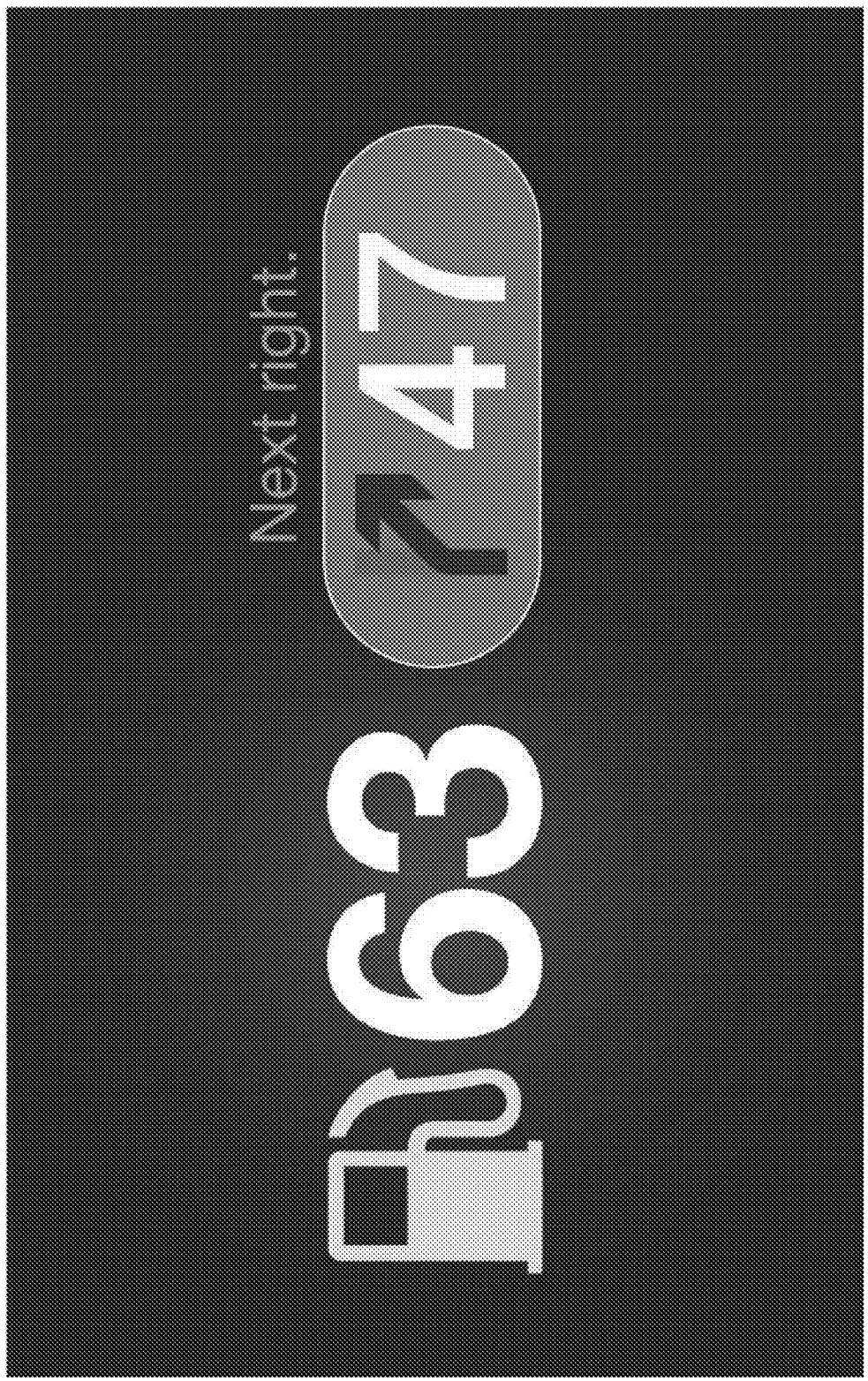

Referring now to FIG. 11, a particular embodiment can use the configuration data 130, the collected data 132, the map data 134, and the sensor data 136 to further customize or personalize the navigation information displayed for the driver. For example, the abstraction layering processor 161 can determine from the sensor data 136 that the fuel level on the vehicle is low. The abstraction layering processor 161 can further use the map data 134 to find a gas station that is conveniently located adjacent to the generated routing. The abstraction layering processor 161 can then generate a highlighted action to notify the driver of the proximate gas station. An example of the display of this highlighted action is shown in FIG. 11.

In another embodiment, the abstraction layering processor 161 can be configured to improve the ability and ease of finding fuel by intelligently predicting the need for fuel based on the sensor data 136 and selecting a convenient fuel station based on the map data 134. In particular, the abstraction layering processor 161 can determine the level of fuel in the vehicle fuel tank and determines the distance the vehicle can travel on the remaining fuel. Then, the abstraction layering processor 161 can access the generated route, if the driver has selected one, and display indicators of fuel stations along the generated route. Optionally, the abstraction layering processor 161 can display a special marker along the current route or current road where the vehicle will run out of fuel. The abstraction layering processor 161 can also be configured to determine when the level of fuel is low and automatically initiate a search for near fuel stations using the map data 134 and generate a route to the nearest fuel station. The routing and the indication of the nearest fuel station can be displayed for the driver. In another embodiment, an external device, such as a mobile device with Internet access, can be used to obtain fuel pricing information. The external device can be accessed using the external device interface 144. In this case, the abstraction layering processor 161 can also be configured to generate a routing to a proximate fuel station with the lowest price fuel. Additionally, the abstraction layering processor 161 can also be configured to generate a routing to a proximate electric charging station for electric vehicles. In this manner, the abstraction layering processor 161 can automatically generate a routing to a proximate location based on a status of the vehicle.

It will be apparent to those of ordinary skill in the art that a variety of other customized or personalized notifications can be presented to the driver based on the data retrieved from data sets 130-136. In another example, the abstraction layering processor 161 can alert the driver of various driving related actions or notifications, using a green/yellow/red type of system. In one example, an alert can suppressed (e.g., no known issues), displayed in yellow (e.g., caution), or displayed in red (e.g., danger). Additionally, the abstraction layering processor 161 can use the data from data sets 130-136 to alert the driver of various driving related issues, such as slow traffic ahead, police or construction ahead, weather advisory, etc. As shown by the sample view of FIG. 11, the driver can quickly ascertain the personalized routing instructions with a brief glance at the displayed information.

Referring again to FIG. 2, the cost of error processor 162 can be configured to assign a level of importance to each navigation decision or action. For example, for some actions such as turns, the cost of missing the action is relatively low; because, the missed action can be remedied by taking the next turn or otherwise correcting the missed action with little deviation from the desired route. In that instance, the criticality of notifying the driver is relatively low, because the cost of missing the action is relatively low. In these cases, the cost of error processor 162 can direct the abstraction layering processor 161 to suppress or reduce the quantity of driver notifications. In other cases, the cost of missing an action is high. For example, if there is no turn around on a highway for several miles, the criticality of notification is very high. In this case, the cost of error processor 162 can be configured to assign a high level of importance to this action. In another example, over time, the cost of error processor 162 can use collected data 132 and map data 134 to determine which actions are difficult or where navigation is historically problematic (e.g., which actions are most often missed by the current driver or collections of other drivers). For example, there are some roadways that are extremely confusing. In these trouble turn or difficult navigation scenarios, the cost of error processor 162 can be configured to apply a high priority to actions in these difficult navigation scenarios thereby making sure the driver is guided as accurately as possible. This may require that additional highlighted actions are generated and displayed to more closely guide the driver in these difficult navigation scenarios. In other example, some navigation scenarios may be historically easy. For example, in some situations, the name of a road may change, but there really isn't a "turn" at all. Current GPS systems can be confused by these situations and erroneously instruct the driver to turn, which can cause confusion about this fairly meaningless change in road names. The cost of error processor 162 can be configured to deprioritize these types of road transitions, because a mistake is rare, or even impossible. In these cases, the cost of error processor 162 can be configured to assign a low level of importance to actions in these situations.

In another embodiment, the cost of error processor 162 can be configured to monitor the state and location of the vehicle relative to the generated routing. For example, the cost of error processor 162 may be aware that the generated routing indicates that the vehicle is supposed to exit the freeway on the right. If the cost of error processor 162 determines the vehicle is in the fast lane on a six lane highway or not slowing for the turn based on the sensor data 136, the cost of error processor 162 can be configured increase the priority of notifying the driver of the imminent turn. For example, the highlighted action icon can be made larger, displayed more prominently, displayed as flashing, an audible alert can be generated, etc. until the driver performs the action indicated by the generated routing. In this manner, the cost of error processor 162 is predictively-aware of the context in which the vehicle is operating.

In another embodiment, the cost of error processor 162 can be configured to calculate a "route difficulty" score for a given start and end point based on how complicated the turns are, how many people historically have taken wrong turns, whether there is construction, or other routing issues. This score can be shown to the driver up front, along with a "street view" animation of the difficult turns on the route so the user/driver can become familiar with the path (i.e., learn the tricky parts of the drive) even before they start.

Referring again to FIG. 2, the near destination processor 163 can be configured to modify a destination selected by the user/driver and automatically substitute a near destination. In some cases, a driver-selected destination or a previously selected destination may be unknown, improperly positioned on a map, currently inaccessible, or otherwise not an appropriate destination to which the vehicle navigation system 150 can generate a valid routing. For example, access to a selected destination may be blocked because of construction detours, police activity, traffic accidents or congestion, weather-related problems, or the like. In response to these situations, the near destination processor 163 can be configured to substitute a near destination for a driver-selected destination. A near destination is an accessible and valid location that is close (e.g., within a pre-configured proximity distance) to the driver-selected destination. The near destination processor 163 can be configured to automatically substitute a near destination and notify the driver of the substituted destination via a displayed message or corresponding symbolic representation.

Thus, a system and method for vehicle navigation with multiple abstraction layers are disclosed.

Figure 12:
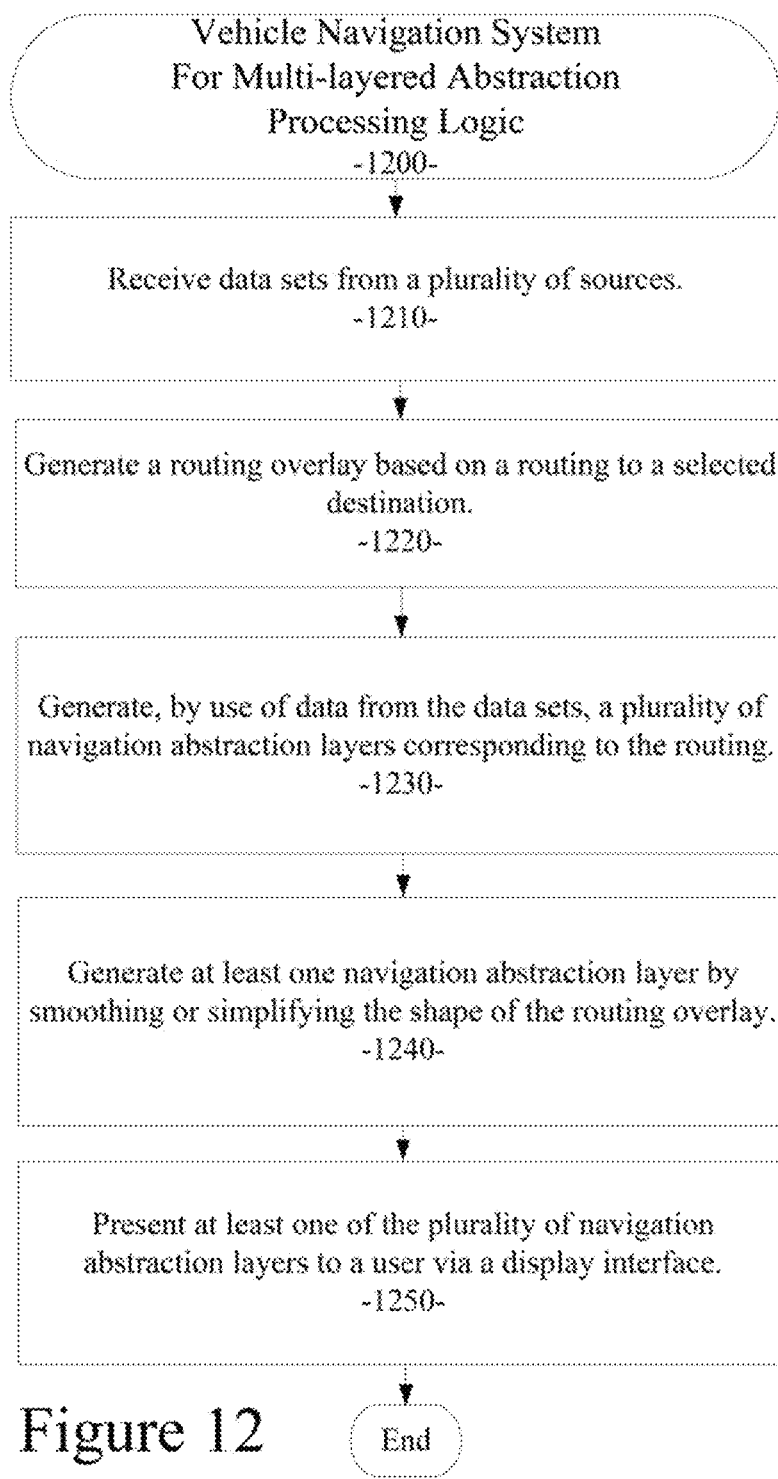
FIG. 12 is a processing flow chart illustrating an example embodiment of a system and method for vehicle navigation with multiple abstraction layers.

FIG. 12 is a processing flow diagram illustrating an example embodiment of a system and method for vehicle navigation with multiple abstraction layers as described herein. The method 1200 of an example embodiment includes: receiving data sets from a plurality of sources (processing block 1210); generating, by use of a data processor, a routing overlay based on a routing to a selected destination (processing block 1220); generating, by use of the data processor and data from the data sets, a plurality of navigation abstraction layers corresponding to the routing (processing block 1230); generating at least one navigation abstraction layer by smoothing or simplifying the shape of the routing overlay (processing block 1240); and presenting at least one of the plurality of navigation abstraction layers to a user via a display interface (processing block 1250).

Figure 13:
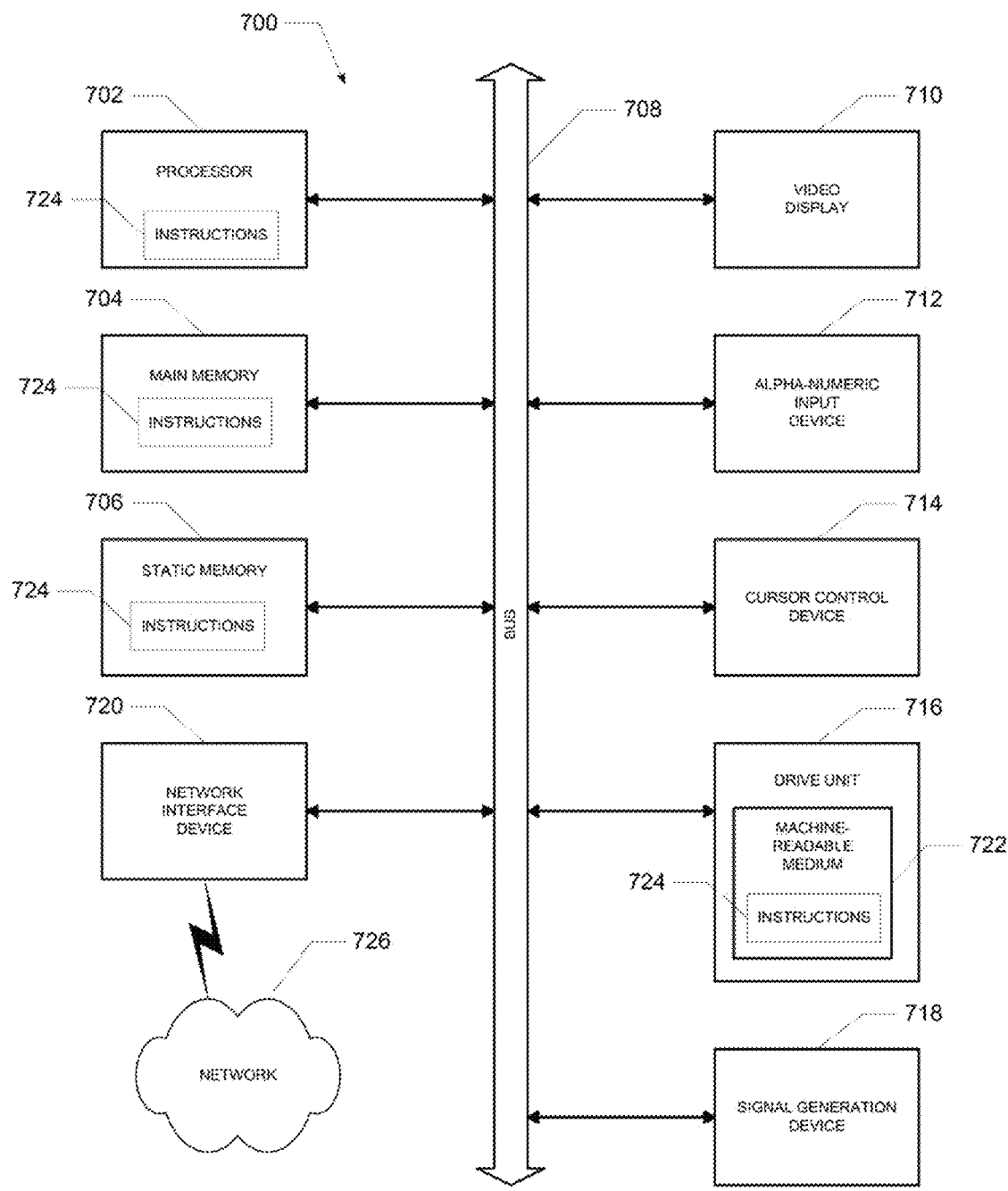
FIG. 13 shows a diagrammatic representation of machine in the example form of a computer system within which a set of instructions when executed may cause the machine to perform any one or more of the methodologies discussed herein.

FIG. 13 shows a diagrammatic representation of machine in the example form of a computer system 700 within which a set of instructions when executed may cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein.

The example computer system 700 includes a data processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a non-transitory machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720. While the machine-readable medium 722 is shown in an example embodiment to be a single medium, the term "machine-readable medium" should be taken to include a single non-transitory medium or multiple media (e.g., a centralized or distributed database, and/or associated caches and servers) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
receiving data sets from a plurality of sources;
generating, by use of a data processor, a routing overlay based on a routing to a selected destination;
generating, by use of the data processor and data from the data sets, a plurality of navigation abstraction layers corresponding to the routing, a portion of the plurality of navigation abstraction layers covering the same map area, except each layer of the portion including a different isolation of map features;
generating at least one navigation abstraction layer by smoothing or simplifying the shape of the routing overlay, the smoothing or simplifying including orthogonally adjusting segments of the routing overlay to produce an overlay having segments that are generally horizontal or vertical; and
presenting at least one of the plurality of navigation abstraction layers to a user via a display interface.

2. The method as claimed in claim 1 wherein the data sets include collected data and map data.

3. The method as claimed in claim 1 including generating at least one navigation abstraction layer by removing all but the most important map features.

4. The method as claimed in claim 1 including generating at least one navigation abstraction layer by highlighting one or more next actions the user must perform to follow the routing.

5. The method as claimed in claim 1 including generating at least one navigation abstraction layer by highlighting one or more next actions the user must perform to follow the routing, the highlighting being personalized for a particular user based on historical data.

6. The method as claimed in claim 1 including generating at least one navigation abstraction layer by highlighting one or more next actions the user must perform to follow the routing, the highlighting being personalized for a particular vehicle based on vehicle sensor data.

7. The method as claimed in claim 1 including automatically generating a routing to a proximate location based on a status of the vehicle.

8. The method as claimed in claim 1 including automatically assigning a level of importance to a plurality of navigation actions.

9. The method as claimed in claim 1 including automatically substituting a near destination for a previously selected destination.

10. A system comprising:
one or more data processors; and
a vehicle navigation system, executable by the one or more data processors, to:

receive data sets from a plurality of sources;
generate a routing overlay based on a routing to a selected destination;
generate, by use of data from the data sets, a plurality of navigation abstraction layers corresponding to the routing, a portion of the plurality of navigation abstraction layers covering the same map area, except each layer of the portion including a different isolation of map features;
generate at least one navigation abstraction layer by smoothing or simplifying the shape of the routing overlay, the smoothing or simplifying including orthogonally adjusting segments of the routing overlay to produce an overlay having segments that are generally horizontal or vertical; and
present at least one of the plurality of navigation abstraction layers to a user via a display interface.

11. The system as claimed in claim 10 wherein the data sets include collected data and map data.

12. The system as claimed in claim 10 being configured to generate at least one navigation abstraction layer by removing all but the most important map features.

13. The system as claimed in claim 10 being configured to generate at least one navigation abstraction layer by highlighting one or more next actions the user must perform to follow the routing.

14. The system as claimed in claim 10 being configured to generate at least one navigation abstraction layer by highlighting one or more next actions the user must perform to follow the routing, the highlighting being personalized for a particular user based on historical data.

15. The system as claimed in claim 10 being configured to generate at least one navigation abstraction layer by highlighting one or more next actions the user must perform to follow the routing, the highlighting being personalized for a particular vehicle based on vehicle sensor data.

16. The system as claimed in claim 10 being configured to automatically generate a routing to a proximate location based on a status of the vehicle.

17. The system as claimed in claim 10 being configured to automatically assign a level of importance to a plurality of navigation actions.

18. The system as claimed in claim 10 being configured to automatically substitute a near destination for a previously selected destination.

19. A non-transitory machine-useable storage medium embodying instructions which, when executed by a machine, cause the machine to:
receive data sets from a plurality of sources;
generate a routing overlay based on a routing to a selected destination;
generate, by use of data from the data sets, a plurality of navigation abstraction layers corresponding to the routing, a portion of the plurality of navigation abstraction layers covering the same map area, except each layer of the portion including a different isolation of map features;
generate at least one navigation abstraction layer by smoothing or simplifying the shape of the routing overlay, the smoothing or simplifying including orthogonally adjusting segments of the routing overlay to produce an overlay having segments that are generally horizontal or vertical; and
present at least one of the plurality of navigation abstraction layers to a user via a display interface.

20. The machine-useable storage medium as claimed in claim 19 wherein the data sets include collected data and map data.

* * * * *